Nov. 3, 1970 M. S. KEELER II 3,538,265
INSTANT REPLAY SYSTEM FOR RADIOS AND THE LIKE
Filed Feb. 1, 1968
FIG I
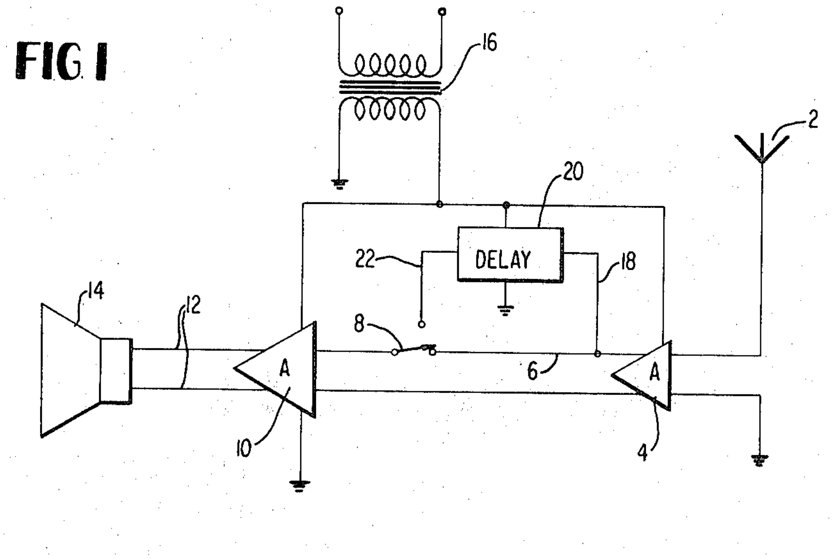
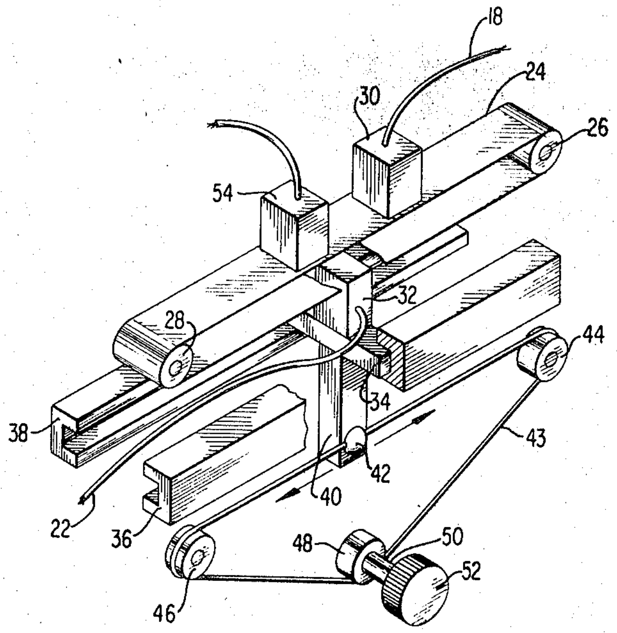
FIG 2
INVENTOR
MINER S. KEELER II
BY Price, Heneveld, Huizenga & Cooper.
ATTORNEYS United States Patent Office 3,538,265
Patented Nov. 3, 1970

3,538,265
INSTANT REPLAY SYSTEM FOR RADIOS AND THE LIKE

Miner S. Keeler II, 2525 Indian Trail SE., Grand Rapids, Mich. 49508

Filed Feb. 1, 1968, Ser. No. 702,271
Int. Cl. G11b *5/48, 31/00;* H04b *1/20*
U.S. Cl. 179—100.11 5 Claims

ABSTRACT OF THE DISCLOSURE

This disclosure relates to a radio or television system wherein reproduced portions can be repeated or replayed so that desirable excerpts can be reheard or reseen and/or so that commercials can be eradicated and replaced with more interesting subject matter. The system employs a delayed signal means such as a continuous tape with recording, reproducing, and erasing heads, and a switch which delivers a signal to visual and/or aural reproduction equipment from either the delay circuit or directly from the signal input to the system.

This invention relates to an instant replay system for entertainment devices such as radios, and televisions and the like, wherein a signal is received and visually and/or aurally reproduced, wherein means are provided to simultaneously delay a signal as it is being reproduced and means are further provided to connect the signal reproduction system to either the delay means or to the signal input to the entertainment system.

Radio and television are great boons to entertainment seekers. The great variety of radio and television programs now available are plagued by the annoying and frequent interruptions from commercials. Generally the commercials last from 30 seconds to one minute and sometimes longer.

Information visually or aurally produced by the home sets or the automobile sets is lost if not received and digested by the listener. However, often it is desirable to have certain information repeated in order to receive or digest the information.

I have now discovered a radio and television system which can be operated to immediately reproduce the last information reproduced by the normal set so as to blot out commercials or have desirable information repeated by simultaneously storing an input signal as it is aurally and/or visually reproduced, and providing a switch to reproduce the input signal without delay or to reproduce the storage signal.

By various aspects of this invention one or more of the following, or other, objects can be obtained.

It is an object of this invention to provide a radio or television set with a means for blotting out commercials and replaying portions of previously reproduced information or music during the commercial time.

It is a further object of this invention to provide a means for replaying desired information immediately after visual and/or aural reproduction of the transmitted material.

Other aspects ,objects, and the several advantages of this invention are apparent to one skilled in the art from a study of this disclosure, the drawings, and the appended claims.

According to the invention there is provided in a radio or television having signal receiving means, amplification means for amplifying the signal received by the receiving means, aural reproduction means operably connected to the amplifier for aurally reproducing the amplified signal, and transmission means connecting the signal receiving means to the amplification means, and the amplification means to the aurally reproduction means; a delay means connected in parallel to at least a portion of the transmission means and switch means operably associated with the transmission means and the output of the delay means to connect the aural reproduction means to the delay means or to the transmission means. In this manner, signals received by the receiving means can be immediately reproduced as they are received or can be delayed for a predetermined length of time and replayed as desired.

Generally, the delay will be from about 30 seconds to about one and one-half minutes. The delay means preferably comprises a continuous magnetic recording medium having a recording head, reproducing head, and an erasing head with the recording and reproducing heads spaced from each other so that the information recorded will be picked up a predetermined time after it has been recorded.

In one embodiment, means are provided to adjust the time for delay between the recording and reproducing means so that the amount of information played back can be varied.

The invention will now be described with reference to the accompanying drawings in which:

FIG. 1 is a schematic representation of a system according to the invention;

FIG. 2 is a more detailed view of the delay system shown schematically in FIG. 1.

Referring now to the drawings, a radio set has an antenna 2 which picks up a transmitted signal and passes it through a preamplifier 4. The signal can then pass through lead 6, switch 8, amplifier 10, and leads 12 to aural reproducing device 14. This reproducing device can be headphones or a speaker.

According to the invention, the signal which is being reproduced is also picked up by lead 18 and passed to delay means 20 which simultaneously and continuously delays the signals which are being reproduced through the amplifier 10 and aural reproducing means 14. A power source 16 such as a transformer, supplies power to the requisite components in the system.

When it is desirable to have information repeated, switch 8 is thrown so that lead 22 is connected to amplifier 10. The information which has been previously delayed in delay means 20 will then be amplified by amplifier 10 and transmitted through leads 12 to aural reproducing means 14.

A system for carrying out the invention is shown more specifically in FIG. 2. The delay means comprises a continuous recording medium 24 which can be magnetic tape or magnetic wire. The recording medium 24 rotates about rollers 26 and 28. Power can be supplied to either roller 26 or 28 to move the recording means 24. Lead 18 is connected to a recording head 30 which continuously records the signals received by antenna 2. A magnetic pick-up 32 is spaced from recording head 30 to pick up the signal recorded on the recording medium 24. An erasing head 54 is provided adjacent the recording head 30 to erase prior recorded signals so that new information and signals can be recorded onto the recording medium 24. The information picked up by the magnetic pick-up 32 is transmitted through lead 22 and, when switch 8 is connected thereto, is transmitted through amplifier 10, leads 12 to speaker 14.

The delay system has a means for adjusting the time delay between the recording and the reproducing so that the amount of replayed information can be adjusted. The adjusting means comprises a cam bar 34 which rides in a pair of C-shaped rails 36 and 38. The cam bar 34 is attached at one side to the recording head 32 and at the other side to link 40. A flexible wire 43 is attached to a knob 42 on link 40 and is wound tightly around rollers 44, 46, and 48. Roller 48 is connected to an adjusting knob 52 through a shaft 50. When adjusting knob 52 is rotated about an axis through shaft 50, flexible wire 43 will be rotated either clockwise or counterclockwise depending on the way the knob 52 is turned. The movement of flexible wire 43 will pull the magnetic pick-up to the right or the left with sam block 34 sliding in rails 36 and 38.

A second alternate way of adjusting the time lag between the recording and reproducing head is to provide an adjusting arrangement for the recording head 30 similar to the adjusting means shown for magnetic pick-up 32.

Although the preferred aspect of this invention is with reference to a radio, it is within the broadest scope of the invention to apply the invention to a television system. To this end, the amplifier 10 would be replaced by a television receiving circuit with a visual display output. Also, the delay mechanism would comprise a video tape recorder having a means to pick up the recorded video information when desirable.

Reasonable variation and modification are possible within the scope of the invention without departing from the spirit thereof.

The embodiments of the invention in which an exclusive property or privilege is claimed are defined as follows:

1. In an entertainment device having signal receiving means, amplification means for amplifying the signal received by said receiving means, reproduction means operably connected to said amplifier for at least aurally reproducing the amplified signal, transmission means connecting said signal receiving means to said amplification means and amplification means to said reproduction means so that a signal received by said signal receiving means will be amplified and transmitted without delay to said reproduction means, the improvement which comprises:

delay means connected in parallel to at least a portion of said transmission means, said delay means including a recording means operatively connected with said transmission means and a separate pick-up means; and switch means operably associated with said transmission means and said pick-up means to connect said reproduction means to said delay means or to said transmission means, whereby signals received by said signal receiving means can be at least aurally reproduced substantially simultaneously as they are received or can be at least aurally reproduced continuously after a delay so that an aurally reproduced signal can be repeated as desired.

2. An entertainment device according to claim 1 wherein said delay means is adapted to delay said signal for at least 30 seconds.

3. An entertainment device according to claim 1 wherein means are provided to adjust the time delay of signals passing through said delay means.

4. A radio comprising the entertainment device described in claim 1, wherein said delay means comprises: a continuous recording medium; said recording means for recording said signal from said transmission means on said recording medium; said pick-up means spaced from said recording means along said recording medium to pick-up said signal recorded on said continuous recording medium; erasing means spaced between said recording means and said pick-up means; continuous recording medium driving means to serially move a given point on said recording medium from said recording means to said pick-up means and to said erasing means.

5. A radio according to claim 4 wherein said delay means is operably connected to said transmission means between said receiving means and said amplifying means.

References Cited

UNITED STATES PATENTS

| | | | |
|---|---|---|---|
| 2,333,235 | 11/1943 | Clausen | 179—6 |
| 2,336,777 | 12/1943 | Clausen | 179—100.2 |

FOREIGN PATENTS

| | | |
|---|---|---|
| 730,664 | 5/1955 | Great Britain. |

STANLEY M. URYNOWICZ, Jr., Primary Examiner

R. F. CARDILLO, Jr., Assistant Examiner

U.S. Cl. X.R.

179—100.2